United States Patent
Norton et al.

(10) Patent No.: US 9,003,410 B2
(45) Date of Patent: Apr. 7, 2015

(54) ABSTRACTING A MULTITHREADED PROCESSOR CORE TO A SINGLE THREADED PROCESSOR CORE

(75) Inventors: Scott J. Norton, San Jose, CA (US); Hyun Kim, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2564 days.

(21) Appl. No.: 11/700,748

(22) Filed: Jan. 30, 2007

(65) Prior Publication Data
US 2008/0184233 A1 Jul. 31, 2008

(51) Int. Cl.
| G06F 9/46 | (2006.01) |
| G06F 9/48 | (2006.01) |
| G06F 9/455 | (2006.01) |
| G06F 9/50 | (2006.01) |

(52) U.S. Cl.
CPC .......... *G06F 9/4843* (2013.01); *G06F 9/45504* (2013.01); *G06F 9/5027* (2013.01); *G06F 2209/5018* (2013.01); *G06F 2209/5021* (2013.01)

(58) Field of Classification Search
None
See application file for complete search history.

(56) References Cited

U.S. PATENT DOCUMENTS

| 7,614,056 | B1 * | 11/2009 | Saxe et al. ...................... 718/105 |
| 7,818,804 | B2 * | 10/2010 | Marceau ........................... 726/23 |
| 2005/0050395 | A1 * | 3/2005 | Kissell ............................. 714/38 |
| 2005/0160424 | A1 * | 7/2005 | Broussard et al. ................ 718/1 |
| 2005/0223199 | A1 * | 10/2005 | Grochowski et al. ......... 712/235 |
| 2006/0095909 | A1 | 5/2006 | Norton et al. |
| 2006/0117316 | A1 | 6/2006 | Cismas et al. |
| 2006/0168254 | A1 | 7/2006 | Norton et al. |
| 2007/0124568 | A1 * | 5/2007 | Kra ................................ 712/226 |
| 2007/0288728 | A1 * | 12/2007 | Tene et al. ...................... 712/227 |
| 2007/0300227 | A1 * | 12/2007 | Mall et al. ...................... 718/102 |

OTHER PUBLICATIONS

Nguyen, K.; Shihjong, K.; "Detecting Multi-Core Processor Topology in an IA-32 Platform"; Intel Corporation Whitepaper; (C) 2006. <http://www.multicoreinfo.com/research/papers/whitepapers/Intel-detect-topology.pdf>.*
Griffin, C.; "[PATCH] Fix hvm cpuid to hide hyperthreaded processor when apic is disabled."; Xen Developer's Forum; posted Apr. 19, 2006; <http://xen.1045712.n5.nabble.com/PATCH-Fix-hym-cpuid-to-hide-hyperthreaded-processor-when-apic-is-disabled-td2487549.html>.*

* cited by examiner

*Primary Examiner* — Charles Swift
(74) *Attorney, Agent, or Firm* — de Guzman & Associates

(57) ABSTRACT

In an embodiment of the invention, an apparatus and method to abstract a multithreaded processor core to single threaded processor core include performing the steps of: viewing, by an operating system, a first hardware thread and a second hardware thread in a processor core; and viewing, by a user application, the first hardware thread and the second hardware thread as a single CPU object.

6 Claims, 3 Drawing Sheets

ABSTRACTING A MULTITHREADED PROCESSOR CORE TO A SINGLE THREADED PROCESSOR CORE

TECHNICAL FIELD

Embodiments of the invention relate generally to abstracting a multithreaded processor core to a single threaded processor core.

BACKGROUND

A multi-core processor architecture is implemented by a single processor that plugs directly into a single processor socket, and that single processor will have one or more "processor cores". Those skilled in the art also refer to processor cores as "CPU cores". The operating system perceives each processor core as a discrete logical processor. A multi-core processor can perform more work within a given clock cycle because computational work is spread over to the multiple processor cores.

Hardware threads are the one or more computational objects that share the resources of a core but architecturally look like a core from an application program's viewpoint. As noted above, a core is the one or more computational engines in a processor. Hardware multithreading (also known as HyperThreading) is a technology that allows a processor core to act like two or more separate "logical processors" or "computational objects" to the operating system and the application programs that use the processor core. In other words, when performing the multithreading process, a processor core executes, for example, two threads (streams) of instructions sent by the operating system, and the processor core appears to be two separate logical processors to the operating system. The processor core can perform more work during each clock cycle by executing multiple hardware threads. Each hardware thread typically has its own thread state, registers, stack pointer, and program counter.

Operating systems today treat each hardware thread of a multithreaded CPU core as an individual processor. This causes many applications to be re-written or modified in order to manage the additional processors and to also ensure that the application tasks are scheduled appropriately on the threads so that they optimize the benefits of hardware multithreading.

Additionally, there are certain operations such as real-time scheduling and real-time application response that are not well suited to multithreaded CPU cores. Applications with this type of behavior cannot tolerate the hardware context switching to another application when the application is in the middle of a critical section. If each hardware thread is treated as an independent CPU, it is not reasonable to yield the alternate hardware thread for long periods of time while the first hardware thread is running a critical real-time application. Operating system vendors currently treat each hardware thread of a multithreaded CPU core as an independent CPU. As a result, the problems discussed above exist in all of these prior implementations.

Therefore, the current technology is limited in its capabilities and suffers from at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
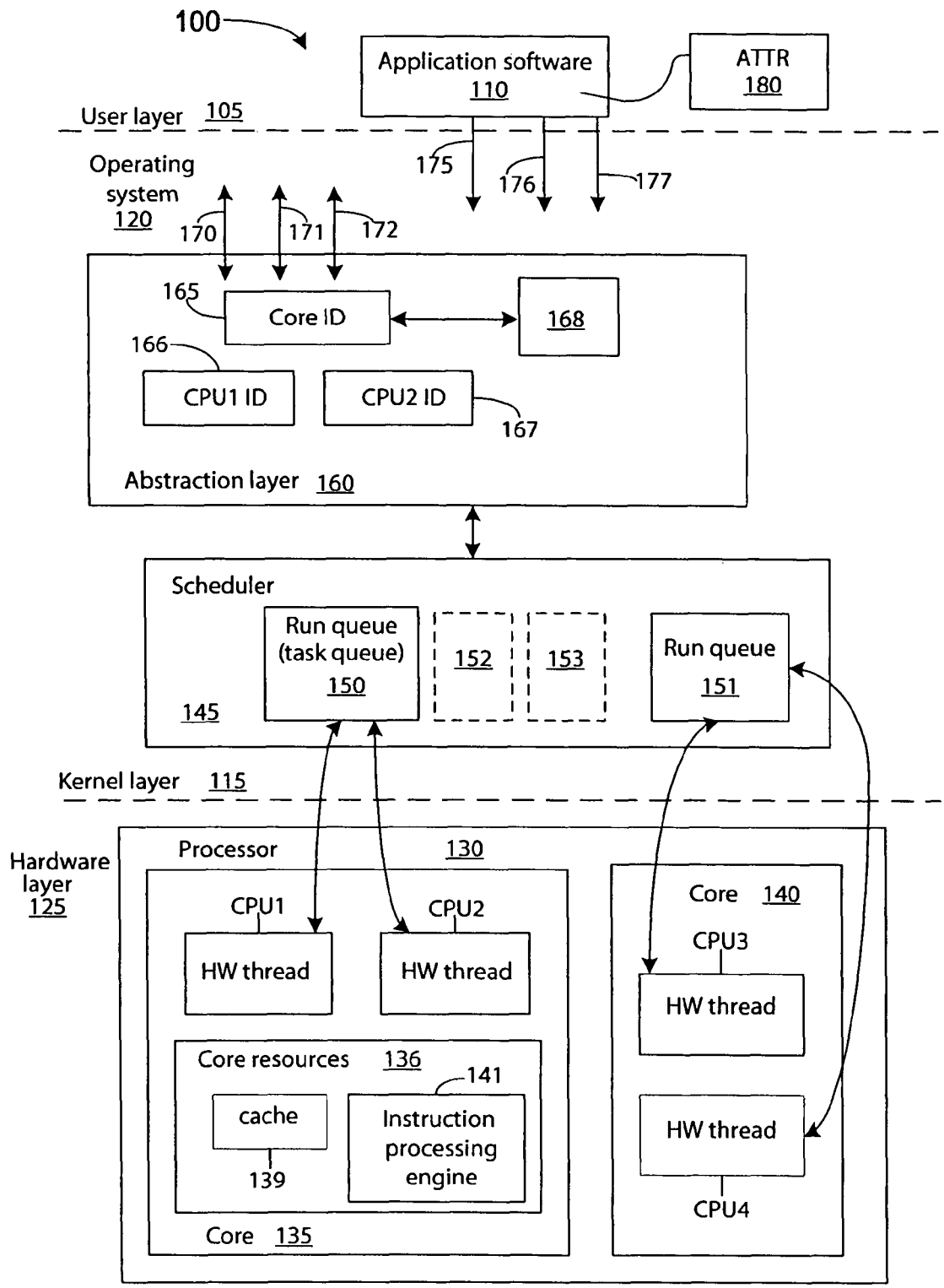
FIG. 1 is a block diagram of a system (apparatus) in accordance with an embodiment of the invention.

FIG. 1 is a block diagram of a system (apparatus) 100 in accordance with an embodiment of the invention. The system 100 is typically a computer system that is in a computing device. A user layer 105 will have an application software 110 that will run in the system 100. A kernel layer 115 includes an operating system 120 with various features as described below. A hardware layer 125 includes a processor 130. The processor 130 includes a core 135. Alternatively, the processor 130 can be multi-core processor by having with multiple processor cores 130 and 140, although the cores in the processor 130 may vary in number in other examples. Since the core 135 includes the hardware threads CPU1 and CPU2, the core 135 is a multithreaded core. The number of hardware threads in a core 135 can vary. A core 135 also has resources 136 which include, for example, a cache 139, instruction processing engine 141, and other known core resources.

Hardware threads CPU1 and CPU2 will be used to discuss the following example operation, although this example operation also applies to hardware threads CPU3 and CPU4 in core 140 as well. Threads CPU1 and CPU2 are sibling hardware threads because they are in the core 135, while CPU3 and CPU4 are sibling hardware threads because they are in the core 140. Typically, the operating system (OS) 120 is booted with hardware multithreading enabled in the hardware layer 125 for the cores. As the OS 120 boots, the OS 120 views each hardware thread CPU1 and CPU2 as multiple CPUs. The OS 120 will continue to boot with threads CPU1 & CPU2 as CPUs. The OS scheduler 145 will treat each set of sibling hardware threads (e.g., CPU1 and CPU2) from the same CPU core as being a single CPU (i.e., as a single hardware thread), by use of an abstraction layer 160 as discussed below. In one embodiment of the invention, the scheduler 145 uses a single run queue (i.e., task queue) for all of the sibling threads from the same CPU core. For example, sibling threads CPU1 and CPU2 will choose/remove software threads from the run queue 150 while the sibling threads CPU3 and CPU 4 will choose/remove software threads from the run queue 151. Alternatively, the scheduler 145 allows the coordination of multiple run queues for each core so that each hardware thread is associated with its own run queue. For example, in this alternative embodiment, the run queues 152 and 153 are associated with the hardware threads CPU1 and CPU2, respectively. When multiple run queues are associated with a core, standard thread stealing methods can be used to steal a software thread in a run queue associated with another hardware thread. Alternatively, all hardware threads will choose/remove software threads from a single run queue in the OS 120. Therefore, in the run queue-to-hardware thread configuration, the run queues and the hardware threads can vary in numbers. As each hardware thread becomes ready to execute an application, the hardware thread will choose a software thread of the application from this run queue and execute that software thread.

In the example of FIG. 1, the kernel views the hardware threads CPU1 and CPU2 in core 135. The abstraction layer 160 will cause the hardware threads CPU1 and CPU2 to be viewed by the user application 110 as a single CPU object 168 that has the identifier CORE ID 165. The abstraction layer 160 also converts a user-specified hardware thread to a set of hardware threads as viewed by the kernel. The abstraction layer 160 gives a CPU identifier (CORE ID 165) for each set of sibling thread identifiers. The CORE ID 165 is exposed to user applications 110 so that the user applications 110 views only one CPU object 168 (with a CORE ID 165) for a core 135. As a result, a user application 110 views the core 130 as a single-threaded core due to the single CPU object ID 168 (with CORE ID 165). Therefore, since a user application 110 does not view the CPU1 ID and CPU2 ID, the user application 110 does not view the core 130 as a multithreaded core. This CORE ID 165 exposes, to a user application, only the CPU core 130 of sibling threads CPU1 and CPU2, and all hardware multithreading support are hidden within the kernel. The sibling thread identifiers (CPU1 ID 166 and CPU2 ID 167) are identifiers of sibling threads (CPU1 and CPU2, respectively) from the same CPU core 135. The CORE ID 165 can be given with the unique identifier (e.g., CORE ID). Alternatively, the CORE ID 165 can be given an identifier of an associated sibling thread (e.g., CPU1 ID or CPU2 ID). Therefore, the abstraction layer 160 converts (translates) the CPU1 ID and CPU2 ID into the CORE ID 165 that is viewed by the user application 110. The abstraction layer 165 also converts (translates) the CORE ID 165 into the CPU1 ID and CPU2 ID that is viewed by the kernel. Therefore, the CPU1 ID and CPU2 ID are mapped with the CORE ID 165.

The OS 120 exposes CPU IDs outward to user-space applications 110. For example, these CPU IDs are exposed in features such as, but not limited to, topology information 170 (e.g., mpctl( ) calls in the HP-UX OS), application to processor binding features 171 (e.g., mpctl( ) calls in HP-UX), and system runtime information 172 (e.g., pstat( ) calls in HP-UX).

As an example, assume that the sibling threads on a multithreaded CPU core 130 contain two hardware threads CPU1 and CPU2 as viewed by the kernel. After conversion by the CPU abstraction layer 160, these threads CPU1 and CPU2 are exposed as a single CPU object 168 (which has the CORE ID 165 in the FIG. 1 example). When an application-to-processor binding request 175 is made to single CPU object with CORE ID 165, the kernel will place the application binding on both the sibling threads CPU1 and CPU2 of core 130. The specified application is allowed to run on either of the two hardware threads CPU1 or CPU2.

As another example, an application 110 that is trying to find out the topology of the system will make the appropriate call 176 to find out the IDs of each of the CPUs. When this application 110 is obtaining a CORE ID 165, internally the kernel will see that both CPU1 ID and CPU2 ID identify the hardware threads that belong to the same CPU core 130 and will thus only return one CORE ID 165 to the application to represent the CPU core 130. In this example the CORE ID 165 will contain the per-core attributes instead of the per-thread attributes.

As another example, an application 110 that is trying to find out how much time a CPU has spent executing in user-space will make a call 177 that will put the CORE ID 165 through the CPU abstraction layer 165 which determines the CORE ID 165 is actually represented by the sibling threads CPU1 and CPU2. The call 177 will then collect information about the user-space from both CPU1 and CPU2 and combine these information into a single number or aggregated value. This single number or aggregated value is then returned to the application 110 that requested the data. This single number indicates, for example, the core utilization for the entire core 130.

Since the abstraction layer 160 completely hides the hardware multithreading from user-space applications, the kernel is free to enable or disable the usage of multithreaded CPUs as is needed for improved performance or correctness. Disabling a single hardware thread for a long period of time has no negative effect on applications. Suitable methods can be used for the disabling of hardware threads.

Another example in which an embodiment of the invention is beneficial is with real-time applications which may not want to have the hardware automatically context switching between a high priority application and a low priority application. This can lead to starvation of the high priority application and can violate Unix standards compliance with real-time scheduling. In other words, when a low-priority application is scheduled on one hardware thread and a high-priority application is scheduled on another hardware thread, the context switching will give each of the two threads an equal amount of processor time. As a result, the thread with the low priority application prevents the best possible progress of the high priority application on the other thread because both hardware threads will consume an equal amount of execution resources of the core. To overcome this problem, when one of the hardware threads starts executing a software thread of a real-time application, the OS 120 can temporarily disable the other sibling hardware threads on the core so that the sibling threads are not able to impact the best possible progress of the real-time application that is being executed. Various methods can be used to temporarily disable the other sibling threads. One method to temporarily disable a sibling thread is to dynamically disable hardware multithreading in a core by removing the sibling thread(s) from the view of the OS 120 to allow the real-time application to consume the full core resources, as similarly described in commonly-assigned U.S. Patent Application entitled "DYNAMIC HARDWARE MULTITHREADING AND PARTITIONED HARDWARE MULTITHREADING", which is hereby fully incorporated herein by reference. Another method to temporarily disable a sibling thread is by placing the thread in a yield loop (such as hint@pause or PAL_HALT_LIGHT on the Intel Montecito processor) to allow the real-time application to consume the full core resources. Once the real-time application is no longer executing, the sibling threads can go back to their normal scheduling.

Some applications may still desire to be able to see the real topology within the system and to be able to control scheduling at the hardware thread level. As an option, an application-level attribute 180 can be set for an application to bypass the kernel abstraction layer 160. This application-level attribute (switch) 180 switch can be implemented in a number of ways such as, for example, by a chatr bit that is set in the executable file or via an environment variable that is read by a library in the OS 120 when the application starts executing. If this switch 180 is set, the user application 110 will bypass kernel CPU abstraction layer 160 and the user application 110 will see the exact information about each of the hardware threads on a per-thread level. This switch 180 also permits, for example, processor binding directly to the individual hardware threads. As known to those skilled in the art, a chatr bit is used for setting attribute information on a per-application basis and the kernel reads the chatr bit when the process of the applications starts to execute.

Hardware multithreading and its impacts to user-space applications are completely hidden within the operating system by use of the above method. By hiding the hardware multithreading within an operating system, the operating system has great flexibility in how to utilize the hardware features. Many operating system features have problems with providing correct behavior in the presence of hardware multithreading, such as real-time scheduling and fair share scheduling. The above-discussed method allows those features to temporarily disable hardware multithreading (through, for example, the hardware yield operations) so that correct behavior can be guaranteed without having impacts to applications in user-space. Exposing hardware threads from multithreaded CPU cores as CPU objects causes a significant impact to a number of application products that may need to be made thread aware. The above method completely hides all aspects of hardware multithreading from user-space applications, yet still takes advantage of the performance benefit that hardware multithreading provides.

Figure 2:
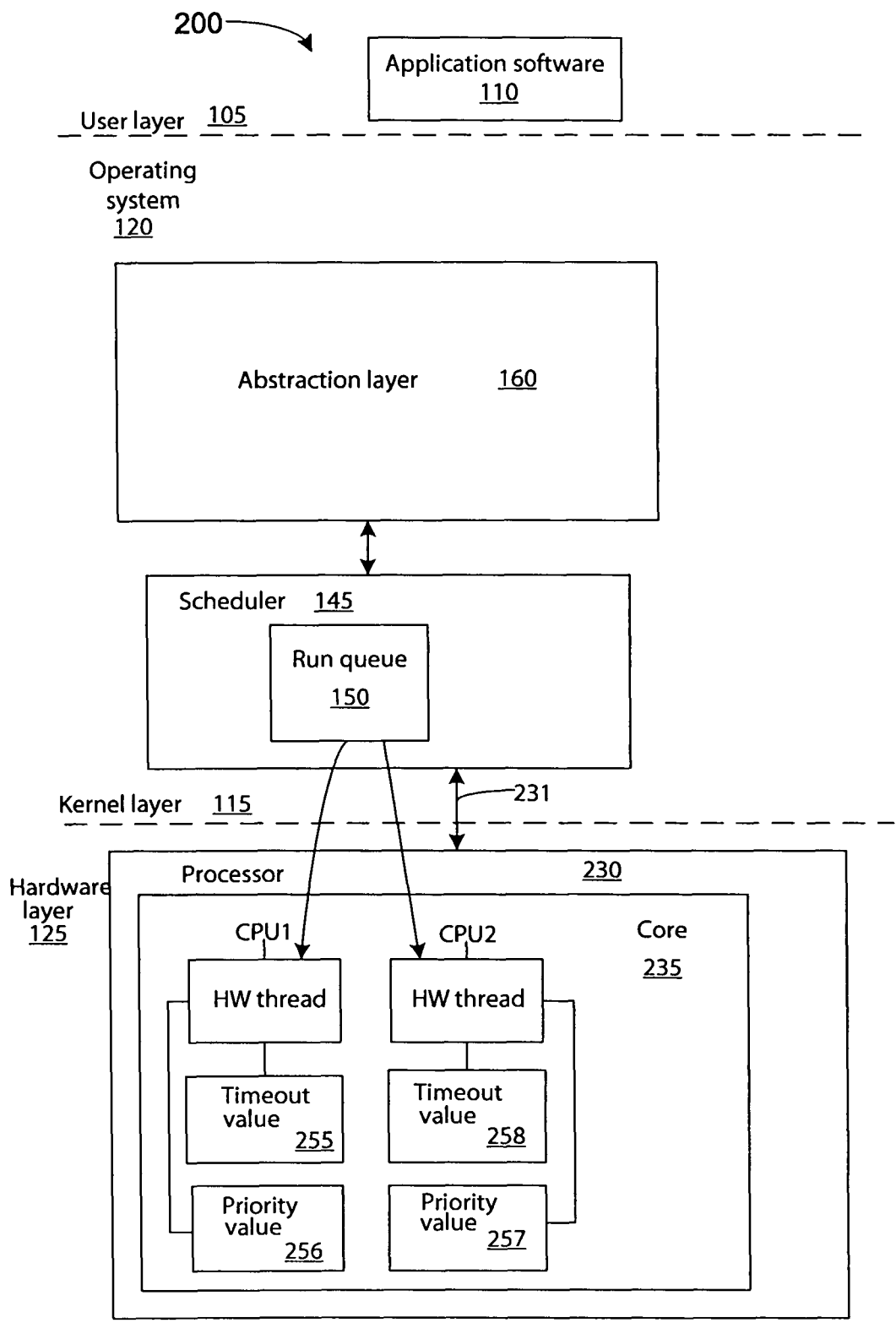
FIG. 2 is a block diagram of a system (apparatus) in accordance with another embodiment of the invention.

FIG. 2 is a block diagram of a system (apparatus) 200 in accordance with another embodiment of the invention. As discussed above, the abstraction layer 160 exposes to the user-space 105 only one single hardware thread which represents all hardware threads contained on a CPU core.

A CPU core 235 is configured to containing one high priority hardware thread (e.g., CPU1) and one or more low priority hardware threads (e.g., CPU2). Software threads (tasks) executing on the high priority hardware thread CPU1 will take precedence over tasks executing on the low priority hardware thread(s) CPU2. Low priority hardware threads will only use the execution pipeline (to execute software threads) when the high priority hardware thread CPU1 is servicing a cache miss event.

The scheduler 145 is aware about the multiple hardware threads CPU1/CPU2 on the CPU core 235, but would still only maintain one run queue 140 for the entire CPU core 235. The scheduler 145 schedules a task on each of the hardware threads on a CPU core. The high priority (primary) hardware thread CPU1 will consume most of the resources of the CPU core 235. All other hardware threads are low priority (secondary) threads (e.g., CPU2 in this example).

Each CPU core 235 will have a set of backup kernel threads or backup user application software threads to run in the event that the CPU core 235 has some spare cycles. These backup (low priority) software threads 250 are scheduled on the low priority hardware threads CPU2. Examples of backup (low priority) software threads 250 include kernel daemons that execute in the background of the kernel and gather, for example, statistical data. The high priority software threads 251 are scheduled on the high priority thread CPU1. For example, the OS 120 will schedule tasks primarily to the high priority thread CPU1. While the primary hardware thread CPU1 switches out to services events such as cache miss events, the secondary (low priority) thread (or threads) CPU2 consumes the execution resources of the core 235. When a cache miss event occurs, the high priority thread CPU1 will go to, for example, a memory area to service the cache miss event and that thread CPU1 will stall in that memory area. Since the thread CPU1 is stalled, the low priority thread CPU2 is able to consume the execution resources of the core 235. Once the high priority thread CPU1 has resolved its cache miss event, the core 235 hardware will context switch back to the high priority thread CPU1 to consume the execution resources of the core 235.

The thread CPU1 is set as a high priority thread by setting a priority value 256 to a high value. As a result, whenever a timeout or other event resulting in hardware scheduling decisions occur, the CPU core 235 chooses the high priority thread CPU1 to run next (if both threads CPU1 and CPU2 are ready to run). The timeout value 255 for the high priority thread CPU1 is set to a large value (e.g., approximately 4096 cycles or greater). For example, a timeout value 255 similar to the OS 120 scheduling time-slice is the maximum desired timeout value 255 for a high priority hardware thread, although this value is not required. The effect of this timeout value setting is that the high priority thread CPU1 will execute and consume the CPU core 235 resources whenever the thread is able to execute (i.e., the thread is not servicing a cache miss event).

For a low priority thread CPU2, the priority value 257 is set low. As a result, whenever a timeout or other event resulting in hardware scheduling decisions occurs, the CPU core 235 chooses the other high priority thread CPU1 to run next instead of choosing the low priority thread CPU2 (if threads CPU1 and CPU2 are ready to run). The timeout value 258 is set to a small value (e.g., approximate 256 cycles) for the low priority thread CPU2. This low timeout value could, for example, be the approximate time that it takes a hardware thread to service a cache miss, although this particular time value is not required.

Note that a when low priority thread is executing in the kernel, the thread may acquire kernel resources such as locks. Since this is a low priority thread, there is a chance the core 235 would context switch out the low priority thread while it is holding a kernel resource, potentially resulting in a negative effect on scalability of the kernel. This potential problem can be solved if the scheduler 145 does not schedule a software application thread that is executing in the kernel on the low priority hardware threads. The scheduler 145 checks on entry to the kernel by the software thread to determine if the CPU is a low priority hardware thread. If so, then the kernel should context switch out the software application thread and find another software application thread that is executing in user-space.

The scheduler 145 may use several approaches to scheduling on the secondary (low-priority) threads. Some example approaches are: (1) scheduling the next highest priority software application thread to give the thread a head start and to allow the thread to start filling the local cache with needed data, and/or (2) only schedule low priority software threads to consume core resources during the CPU idle time while the primary hardware thread is servicing cache misses to ensure all software application threads make better forward progress.

The high priority (primary) hardware thread is treated like a normal CPU. Tasks will be scheduled as is normally done in the kernel. This high priority hardware thread will consume all of the CPU core's execution resources whenever it is able to execute (for example, when not servicing a cache miss event). Because of this behavior, when high priority real-time software application threads are scheduled to run on the primary hardware thread, they will not be context switched out by the CPU core to allow other lower priority software application threads to execute.

Figure 3:
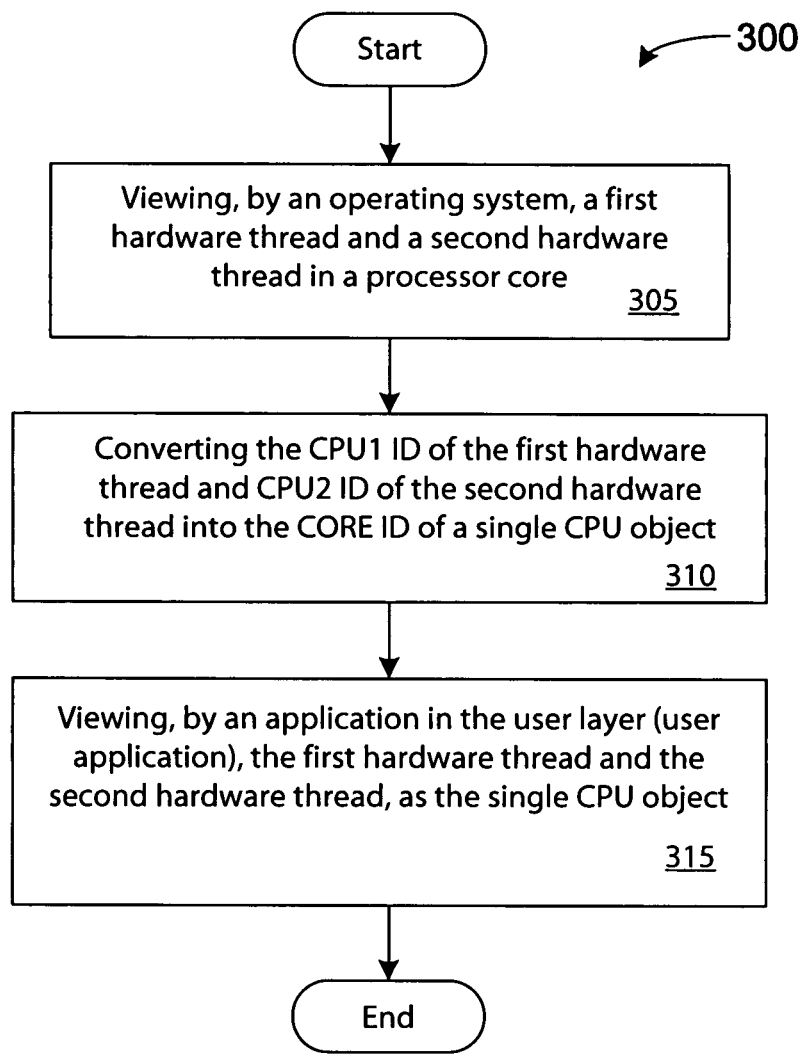
FIG. 3 is a flow diagram of a method in accordance with an embodiment of the invention.

FIG. 3 is a flow diagram of a method 300 in accordance with an embodiment of the invention. The method permits abstracting a multithreaded processor core to single threaded processor core. Block 305 includes the step of viewing, by an operating system, a first hardware thread and a second hardware thread in a processor core.

Block 310 includes the step of converting (translating) the CPU1 ID (identifier) of the first hardware thread and the CPU2 ID (identifier) of the second hardware thread into the CORE ID 165 (identifier) of a single CPU object 168.

Block 315 includes the step of viewing, by a user application (application in the user layer 105), the first hardware thread and the second hardware thread as the single CPU object 168.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system comprising non-transitory tangible computer-readable storage media encoded with operating-system code configured to, when executed by a multi-threaded multi-core processor:

recognize and schedule processes for execution on each of plural hardware threads of said processor; and represent said processor to a client application as having multiple cores with a single hardware thread per core only while an attribute for said client application is not set, said operating-system code being further configured to, when said attribute is set, represent each of said hardware threads to said client application.

2. A system as recited in claim 1 further comprising said processor, each core of said processor having plural sibling hardware threads.

3. A method comprising:

recognizing and scheduling processes for execution on each of plural hardware threads of a processor; and representing said processor to a client application as having multiple cores with a single hardware thread per core only while an attribute for said client application is not set, said operating-system code being further configured to, when said attribute is set, represent each of said hardware threads to said client application.

4. A method as recited in claim 3, wherein each core of said processor has plural sibling hardware threads.

5. An apparatus comprising:

a computer system including a processor and an operating system, wherein the operating system:

recognizes and schedules processes for execution on each of plural hardware threads of said processor; and represents said processor to a client application as having multiple cores with a single hardware thread per core only while an attribute for said client application is not set, said operating-system code being further configured to, when said attribute is set, represent each of said hardware threads to said client application.

6. An apparatus as recited in claim 5, wherein each core of said processor has plural sibling hardware threads.

* * * * *